March 25, 1969
R. E. CHRISTENSEN ET AL
3,434,447
PROPELLER-DRIVEN WATERCRAFT
Filed Jan. 4, 1968
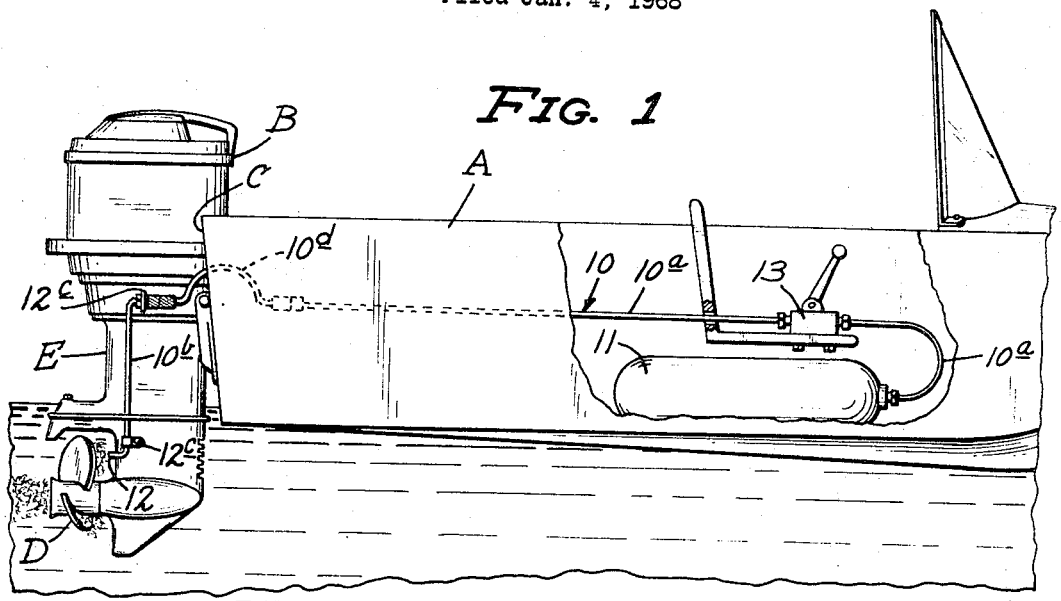
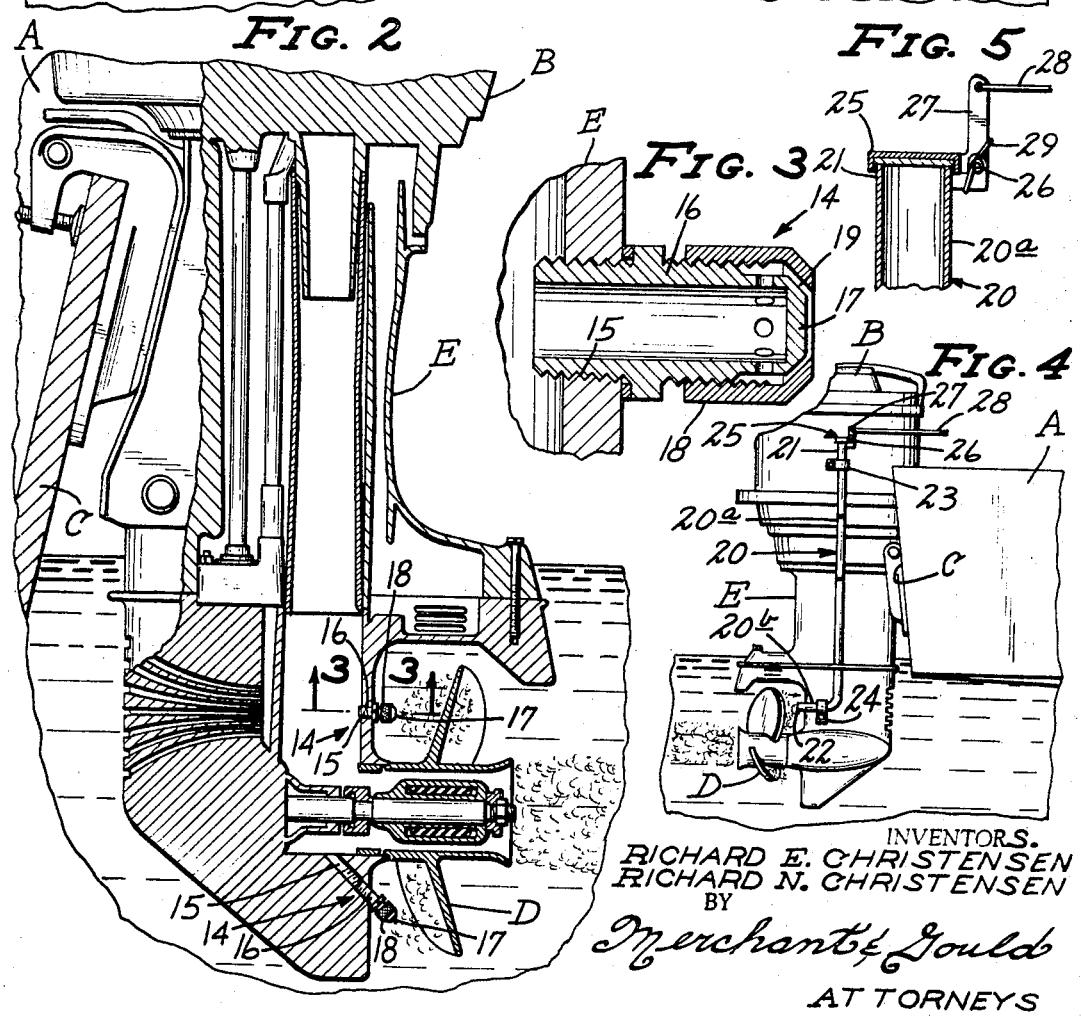
INVENTORS.
RICHARD E. CHRISTENSEN
RICHARD N. CHRISTENSEN
BY
Merchant & Gould
ATTORNEYS United States Patent Office 3,434,447
Patented Mar. 25, 1969

3,434,447
PROPELLER-DRIVEN WATERCRAFT
Richard E. Christensen and Richard N. Christensen,
both of Rte. 1, Olivia, Minn. 56277
Filed Jan. 4, 1968, Ser. No. 695,594
Int. Cl. B63h 1/14, 25/50
U.S. Cl. 115—.5                                    6 Claims

ABSTRACT OF THE DISCLOSURE

A conduit connected to an engine of a boat, the conduit having an inlet end communicating with a source of fluid having a density less than that of water, and an outlet end disposed forwardly of the working portion of the propeller blade of the engine in radially spaced relationship to the propeller hub, and means for controlling the flow of fluid from the outlet end of the conduit to cause a controlled cavitation at the working portion of the propeller.

Background of the invention

In the operaton of motor equipped boats, such as during the towing of one or more water skiers, it is a well known fact that maximum pulling force of the boat should be had prior to the time the skier or skiers emerge from the water. This is also true, of course, in other cases wherein the boat is under heavy load and maximum power is required when the boat is just proceeding under way. Unfortunately, at this time, the engine normally is rotating at a reduced rate of revolutions per minute due to the resistance of the propeller against water, and, because the power output of the engine is related directly to the revolutions per minute, the power output is very low. The only prior answer to the problem was to replace the engine with one having a higher power output during its low revolution operation. This, of course, can be a very costly operation, both in intial expense and in subsequent operation during which such power requirements are unnecessary.

Summary of the invention

To alleviate the above problems with engines in which the power output may be undersize during the requirement for such heavy power output, we have provided a tubular conduit having an inlet end in communication with a source of fluid having a density less than that of water, and an outlet end disposed forwardly of the working portion of the propeller blades and in spaced relation to the hub of the propeller. Examples of a suitable fluid would be air under atmospheric pressure, compressed air or gas in a remote tank, or exhaust gases derived from the exhaust system of the engine itself. Additionally, means are provided for controlling the flow of fluid from the outlet end of the tubular member. With this arrangement, a controlled amount of fluid such as air or exhaust gases may be supplied just forwardly of the working portion of the propeller, thus causing a slight cavitation or slippage thereof. This controlled cavitation or slippage results in a higher revolution per minute of the engine, and, consequently, a higher power output thereof at a time when it is most needed.

Upon forward movement of the boat, the engine revolutions increase due to less resistance of the water against the propeller, and the affect of cavitation at the propeller is substantially negated since the cavitating fluid is dispersed rearwardly. Alternatively, a manually controlled valve may be operatively connected to the conduit to permit complete closure to the flow of fluid through the conduit when the engine has reached an operational condition wherein there is a sufficient power output and the boat on which it is mounted attains sufficient speed.

It is, therefore, an object of our invention to provide a device for increasing the power output of an engine during initial operation of movement of a boat.

It is a further object of our invention to provide a device of the class described which is easily and inexpensively mounted on engines presently in use or now being manufactured.

These and other important objects will become apparent to those skilled in the art upon consideration of the following specification, appended claims, and attached drawings.

Brief description of the drawings

With more particular reference to the attached drawings, wherein like characters indicate like parts throughout the several views:

FIGURE 1 is a view partially in vertical section and partially in side elevation of a boat and outboard motor showing one embodiment of our invention mounted thereon, portions thereof broken away;

FIGURE 2 is an enlarged fragmentary view in side elevation of an outboard motor showing a modified embodiment of our invention mounted thereon, portions thereof broken away and shown in section;

FIGURE 3 is an enlarged axial section as seen from the line 3—3 of FIGURE 2;

FIGURE 4 is a view similar to FIGURE 1 showing a still further embodiment of our invention, portions thereof broken away; and FIGURE 5 is an enlarged view in vertical section of the upper portion of the invention shown in FIGURE 4.

Description of the preferred embodiments

Referring initially to FIGURE 1, there is shown a conventional power boat A powered by an outboard-type engine B secured to the stern C of boat A. Engine B is provided with the propeller D. It is noted that the portion of propeller D hereinafter referred to as "the working portion," is generally that part which constitutes the radially outer two-thirds of the blades of the propeller, and which, during operation, acts to impart the major portion of the propelling power of the propeller D and thus offers the greatest amount of resistance to rotary movements of the propeller during operation.

To reduce the amount of this resistance during initial movements of the boat A, thus increasing the revolutions per minute of the engine B driving the propeller D, and, consequently, the power output thereof, we previde a tubular conduit indicated generally by the numeral 10. One portion 10a of conduit 10 has an inlet end connected to a source of fluid, having a density less than that of water, which, in this embodiment, is a tank 11 of compressed air. Conduit portion 10a extends from tank 11 rearwardly over stern C of boat A and terminates in a conduit portion 10b having an outlet end 12. A pair of brackets 12c are used to secure conduit portion 10b to engine B. A flexible conduit portion 10d is interposed between the connects adjacent ends of conduit portions 10a and 10b to permit steering movement of motor B relative to boat A. As shown, outlet end 12 is disposed forwardly of the working portion of the propeller D in radially spaced relation to the hub thereof and serves to direct a flow of air or gas from the tank 11 to the vicinity immediately forwardly of the working portion of propeller D. Introduction of air in this vicinity causes a cavitation at propeller D, thus reducing friction to an amount wherein the propeller rotates at a higher rate than it normally would during such initial movements. To prevent over cavitation or the revolutions per minute of motor B from becoming excessive, we provide a manually controlled valve element 13. Valve element 13 is interposed in portion 10a of conduit 10 adjacent the operator's seat of boat A, and may be manipulated to control the flow of air from outlet 12 to prevent such excessive cavitation at propeller D, or, alternatively, to terminate the flow of air when boat A has reached a desired forward operating speed.

FIGURES 2 and 3 show a second embodiment of our invention indicated generally by the numeral 14. In this embodiment, the source of fluid is derived directly from the conventional exhaust system of the engine B. As shown, an exhaust passage extends from the power head down through the drive shaft housing E and exits through the hub of propeller D. Housing E is modified by drilling one or more openings 15 therein which communicate with the exhaust passage in housing E. Openings 15 each have nipples 16 screw-threadedly received therein and cooperate therewith to form a conduit for exhaust gases from the exhaust passage of housing E. Openings 15 and nipples 16 are positioned relative to the propeller D so as to place the outlet ends 17 of nipples 16 directly forwardly of the working portion of the propeller D. As such, exhaust gases flow from the outlet ends 17 and cause a cavitation at the working portion of the propeller D. Thus, as explained relative to the structure of FIGURE 1, propeller D meets less resistance to rotary movement which in turn permits increased revolutions of engine B and increased power output thereof.

To prevent the engine B of FIGURE 2 from exceeding a safe level of revolutions, by excessive cavitation at propeller D, nipple 16 is provided at its outlet end 17 with an adjustable valve member 18 which, with nipple 16, defines an adjustable orifice 19. Adjustable orifice 19 permits controlled cavitation at propeller D by varying the size of orifice 19. It will be noted that no remotely controlled positive shut off of the flow of gases from adjustable orifice 19 is provided in the structure of FIGURES 2 and 3. Orifice 19 is adjusted, by rotation of valve element 18, to a size to permit only a slight build-up of exhaust gases at the working portion of propeller D, causing a slight cavitation thereat as the boat A initially stands substantially motionless in the water. As the revolutions of the propeller D increase, and, consequently, the revolutions and horsepower of the power head of engine B, boat A moves slightly forward. At a predetermined time, determined by the adjustment of valve element 18, this movement, together with the action of propeller D, causes the built up exhaust gases from orifice 19 to be displaced rearwardly. Thus, propeller D attains substantially its full propelling force, under maximum horsepower of engine B, since the gases expelled by orifice 19 now cause only a very slight or negligible cavitation at propeller D. As the speed of boat A increases, the affect of gases flowing from orifice 19 is even less noticeable, due to the speed at which propeller D is passing through the water, and boat A easily attains a state known as "planing," since engine B is now operating at substantially full horsepower.

FIGURES 4 and 5 show a still further modified embodiment of the present invention which includes a conduit indicated generally by the numeral 20. Conduit 20 includes a generally vertically disposed portion 20a, the upper end of which terminates in an inlet end 21 disposed somewhat above the level of the water in which boat A is sitting. Conduit portion 20a extends downwardly from inlet end 21 to a level below the surface of the water and is formed to provide a generally horizontal portion 20b that terminates at an outlet end 22 which is disposed forwardly of the working portion of propeller D. A pair of mounting brackets 23, 24 are adapted to secure conduit 20 to engine B, the former of which mounts portion 20a to the power head of engine B, and the latter of which mounts portion 20b to housing E.

During the initial application of power to engine B, such as when an attempt is being made to extricate a water skier from a position wherein he is substantially submerged in water, a vortex is created in the area of propeller D. Such vortex creates a vacuum at the outlet end 22 of conduit 20 and air, under atmospheric pressure, enters inlet end 21 of conduit 20 and passes therethrough to flow from outlet end 22 toward the working portion of propeller D. A slight cavitation at propeller D now occurs, in the same manner as the structures of FIGURES 1 and 2, permitting increased speed of rotation of propeller D under conditions of relatively low horsepower of engine B. It will be noted, that the diametric dimensions of conduit 20 are of a predetermined size so that excessive cavitation does not occur at propeller D.

For the purpose of terminating the flow of air from outlet end 22 of conduit 20, there is provided a valve or cover 25 overlying inlet end 21. Cover 25 is pivotally mounted, as at 26, to the inlet end 21 and includes a lever 27 carried by cover 25 and extending upwardly from the pivot 26. A control line 28 is connected to the free end of lever 27 and extends forwardly to the area of the operator's seat in boat A. Thus, when it is desired to provide a slight cavitation at propeller D, an operator has but to pull the control line 28 pivoting the cover 25 about the pivot 26, to remove same from overlying relationship to the inlet end 21 of conduit 20. Conversely, when cavitation of propeller D is no longer desired, the line 28 is released and cover 25 returns to the position of FIGURE 5 under the bias of a coiled torsion spring 29, mounted on pivot 26 in a conventional manner and the flow of air from outlet 22 is terminated.

Thus, in the case of each embodiment, a controlled cavitation of the propeller of an engine for propelling a boat is achieved to provide an increase in the power output of the engine, by increasing revolutions per minute of the engine, at a time when such power increase is most needed, that is, the power increase is needed when a boat is initially moving forward and is particularly needed under a condition wherein the boat is operating under a heavy load.

This invention has been thoroughly tested and found to be completely satisfactory for the accomplishment of the above objects; and while we have shown and described above a preferred embodiment thereof in which the principles of the present invention have been incorporated, we wish it to be specifically understood that the same may be modified without departure from the scope and spirit of the appended claims.

What is claimed is:

1. A device for imparting a controlled cavitation at the working portion of a motor driven propeller of a boat comprising:
    (a) a conduit having an inlet end and an outlet end of a predetermined diametric dimension;
    (b) said inlet end communicating with a source of fluid having a density less than that of water; and
    (c) said outlet end being disposed adjacent to and forwardly to the working portion of the propeller in radially spaced relation to the hub thereof to cause a maximum controlled cavitation at the working portion of the propeller.

2. The apparatus of claim 1 including adjustable control means for controlling the flow of fluid from said outlet end of said conduit.

3. The apparatus of claim 1 in which the source of fluid is under a pressure greater than that of atmosphere.

4. The apparatus of claim 1 in which said inlet end of said conduit communicates with the exhaust tube of an internal combustion engine imparting rotary movements to the propeller.

5. The apparatus of claim 2 in which said control means is a manually adjustable valve interposed in said conduit between said outlet end and the source of fluid conveyed by said conduit.

6. The apparatus of claim 2 in which said control means is an adjustable valve element connected to said outlet end of said conduit whereby to restrict the flow of fluid from said outlet end.

References Cited

UNITED STATES PATENTS 888,274  5/1908  Trishman _____ 114—67.1

ANDREW H. FARRELL, *Primary Examiner.*

U.S. Cl. X.R.

114—67; 170—135.4